United States Patent
Tanaka

(10) Patent No.: US 10,185,783 B2
(45) Date of Patent: Jan. 22, 2019

(54) DATA PROCESSING DEVICE, DATA PROCESSING METHOD, AND NON-TRANSITORY COMPUTER READABLE MEDIUM

(71) Applicant: Toshiba Memory Corporation, Minato-ku, Tokyo (JP)

(72) Inventor: Shingo Tanaka, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 579 days.

(21) Appl. No.: 14/847,589

(22) Filed: Sep. 8, 2015

(65) Prior Publication Data

US 2016/0124950 A1 May 5, 2016

(30) Foreign Application Priority Data

Oct. 31, 2014 (JP) .................................. 2014-223490

(51) Int. Cl.
*G06F 17/30* (2006.01)

(52) U.S. Cl.
CPC .. *G06F 17/30949* (2013.01); *G06F 17/30091* (2013.01)

(58) Field of Classification Search
CPC ........... G06F 17/30949; G06F 17/3067; G06F 17/30516
USPC ............ 707/747, 809; 711/103, 161; 380/37
See application file for complete search history.

(56) References Cited

U.S. PATENT DOCUMENTS

| | | | | |
|---|---|---|---|---|
| 5,313,585 A * | 5/1994 | Jeffries | .................. | G11B 19/02 711/112 |
| 5,473,761 A * | 12/1995 | Parks | .................... | G06F 3/0601 710/26 |
| 5,873,097 A * | 2/1999 | Harris | ............... | G06F 17/30348 |
| 7,783,037 B1 * | 8/2010 | Bong | .................... | H04L 9/0631 380/259 |
| 7,817,721 B2 * | 10/2010 | Keck | .................... | H04N 5/4401 375/240.25 |
| 7,958,255 B1 * | 6/2011 | Karighattam | ....... | H04L 49/9057 709/232 |
| 8,255,620 B2 * | 8/2012 | Frost | .................. | G06F 11/1068 711/103 |

(Continued)

FOREIGN PATENT DOCUMENTS

| | | |
|---|---|---|
| JP | 2016-045594 | 4/2016 |
| JP | 2016-177688 | 10/2016 |

*Primary Examiner* — Jeff A Burke
(74) *Attorney, Agent, or Firm* — White & Case LLP

(57) ABSTRACT

According to one embodiment, a data processing device, includes: a request receiver, a buffer, a first circuitry and a second circuitry. The request receiver receives a write request containing a first key and first data. The buffer temporarily buffers the first data contained in the write request. The first circuitry, according to a buffering status of the first data in the buffer, reads second data which is partial data of the first data that is not read yet out of the first data buffered in the buffer and generates a second key according to a position of the second data in the first data, based on the first key. The second circuitry associates a data structure containing the second data with the second key and adds the data structure into a data structure set whose elements are associated with second keys.

20 Claims, 10 Drawing Sheets

(56) References Cited

U.S. PATENT DOCUMENTS

| | | | |
|---|---|---|---|
| 8,397,062 B2* | 3/2013 | Roy-Chowdhury | H04L 9/14 |
| | | | 713/157 |
| 8,938,072 B2* | 1/2015 | Coric | H04L 9/08 |
| | | | 380/277 |
| 9,118,464 B2* | 8/2015 | Nix | H04W 4/70 |
| 2004/0042278 A1* | 3/2004 | Bailey | G06F 12/0215 |
| | | | 365/200 |
| 2004/0049603 A1* | 3/2004 | Boyd | G06F 13/102 |
| | | | 710/1 |
| 2009/0097644 A1* | 4/2009 | Haruki | G11B 20/00086 |
| | | | 380/200 |
| 2009/0249001 A1* | 10/2009 | Narayanan | G06F 1/3203 |
| | | | 711/161 |
| 2011/0196899 A1* | 8/2011 | Hughes | G06F 17/30091 |
| | | | 707/809 |
| 2011/0276744 A1 | 11/2011 | Sengupta et al. | |
| 2012/0079174 A1* | 3/2012 | Nellans | G06F 12/0246 |
| | | | 711/103 |
| 2013/0091237 A1* | 4/2013 | Arulambalam | H04L 65/60 |
| | | | 709/213 |
| 2013/0179351 A1* | 7/2013 | Wallner | G06Q 20/34 |
| | | | 705/71 |
| 2013/0226931 A1* | 8/2013 | Hazel | G06F 17/30094 |
| | | | 707/741 |
| 2016/0054929 A1 | 2/2016 | Tanaka | |
| 2016/0275199 A1 | 9/2016 | Tanaka | |

* cited by examiner

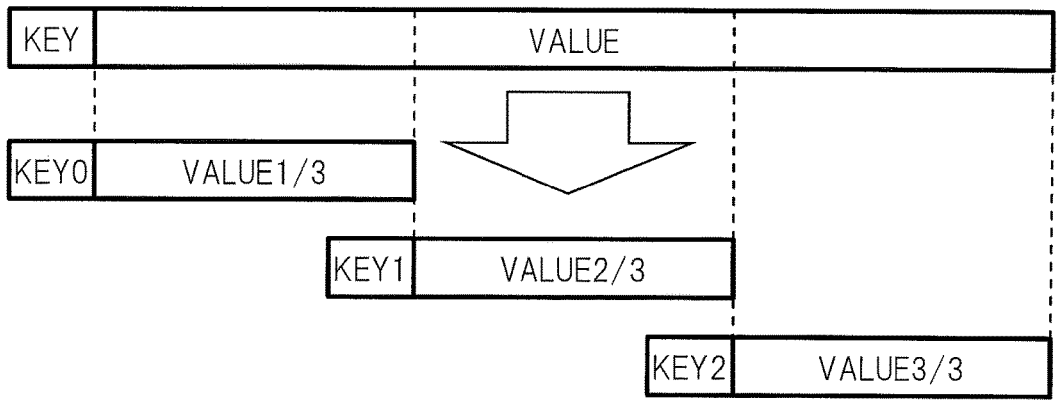
FIG. 6
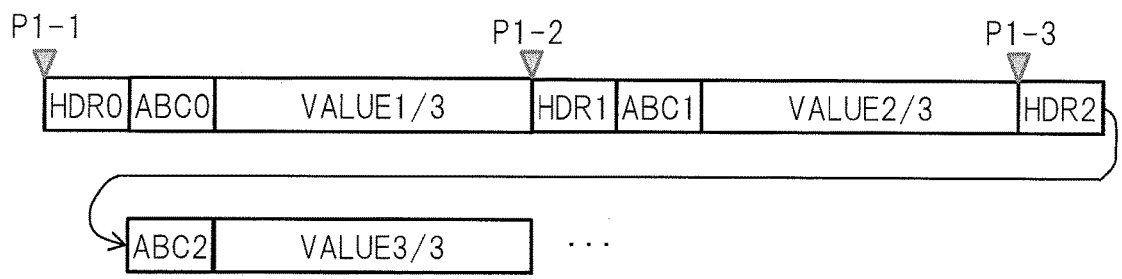
FIG. 7
KEY TABLE
| KEY VALUE | ADDRESS |
|---|---|
| ABC0 | P1-1 |
| ABC1 | P1-2 |
| ABC2 | P1-3 |
|  |  |
| DEF | P2 |
|  |  |
| GHI | P3 |
|  |  |
FIG. 8

DATA PROCESSING DEVICE, DATA PROCESSING METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2014-223490, filed Oct. 31, 2014; the entire contents of which are incorporated herein by reference.

FIELD

Embodiments described herein relate to a data processing device, a data processing method, and a non-transitory computer readable medium program.

BACKGROUND

In recent years, advanced Web services represented by Web mail, social networks, and the like have rapidly come into widespread use. In such a Web service, when a Web server receives a Web page display request from a user, the Web server queries a backend storage of required data on individual texts, images, movies, and the like one by one, acquires the data, and transmits the data as a response to the user.

As such a storage, conventional file-system-based databases are used, but recent years have seen increasing use of object storages, in which unique URLs are specified to access content data, and which thus have a high compatibility with a contents access method over the Internet. Such an object storage employs a key-value store based I/F, with which a variable-length value is accessed with a unique variable-length key from a client device such as a Web server over Ethernet. In the case of Web servers, in general, the key is a URL and the value is content data. As to the key, an object ID is not variable-length but fixed-length, but basic principles are similar. Well-known systems include Ceph, Openstack, and the like as free software. In addition, as a storage device, an HDD or an SSD is used.

When an HDD or an SSD is used in combination with KVS (Key-Value Store) processing, owing to its poor random writing performance, a method called log structured writing is often used. In the log structured writing, couples of keys and values to be written (hereafter, described as key-values) are sequentially written on storage addresses in a receiving order of write requests. In the case of KVS processing using a hash table, a head address at which a key-value is written is saved to each entry in the hash table. If another writing of a key-value for the same key occurs, the address of a key-value that is written later is saved, and the key-value that is written later is used. The key-value that is written previously (or a key-value that is intentionally deleted) is overwritten with data subsequent on the address (the subsequent data is moved to the address at which the key-value existed) by garbage collection executed in the background, and a free space is increased accordingly.

Owing to the characteristics of the log structured writing, writing of one key-value cannot shift to writing of another key-value in the middle. For this reason, a key-value being written needs to be written to the last. Therefore, in the case where a key-value to be written is received over a network such as Ethernet, in particular in the case where the key-value is divided into a plurality of packets, writing the key-value in a storage cannot be started until the reception of all the packets forming the key-value is completely finished. The reason is that there is a risk that the reception of key-values stops in the middle due to network failure or a failure on a client device side. In addition, a network is shared among a plurality of communication connections (e.g., TCP connections), and a plurality of key-values may be simultaneously received from one or more client devices. In that case, a bandwidth occupied by a single communication connection is only a portion of the entire network bandwidth, and thus if receiving and writing are simultaneously performed, a writing speed is limited according to a speed of the occupied portion of network bandwidth. Therefore, from a viewpoint of efficient utilization of a storage performance, it is better to write key-values at once after the reception of the key-values is completely finished.

In the case where, in such a manner, the operation is to write key-values in a storage after the reception of the key-values is completely finished, a large-sized receiving buffer need to be prepared. For example, suppose that accesses occur from 1000 client devices (e.g., Web servers), assuming a large-scale data center or the like. When each client device is formed by, for example, two sockets (two CPUs), and each CPU includes 12 physical cores, this makes 24 threads per CPU virtual threading and 48 threads per client device, and the number of threads of all the client devices is 48,000. Assuming that a communication connection is made with each of these threads, and 1 MB of data, for example, is received from each of these communication connections simultaneously, this requires as much as a receiving buffer of 0.5 MB (average from 0 to 1 MB)×48000 connections=24 GB. While this is the case where the pieces of data are simultaneously received, which may be a rare case as an actual environment, the design for a memory may be made taking such a worst case into consideration.

In addition, in a method of securing a buffer memory in a fixed manner, it is needed to allocate buffers of a maximum data size for all the connections. For example, if the maximum data size is 1 MB, this requires 48 GB, which is twice as much as the above. In addition, if, during writing in the storage after the reception, the next reception is simultaneously received using, for example, a double buffer, this requires 96 GB of capacity, which is further twice as much.

Since the KVS processing is a basic function, this may be implemented as, for example, dedicated hardware logic. Since the hardware logic is not very good at dynamic memory allocation, the above-described fixed memory allocation may be performed, and the above double buffer configuration may be used for the pursuit of further performance. For this reason, the above-described 96 GB of capacity can actually come true in such a case. Such a buffer is typically implemented by a DRAM, and this results in a significant increase in cost.

BRIEF DESCRIPTION OF THE DRAWINGS

FIG. 6 is a diagram schematically showing an example in which an original value is divided into three portions to each of which a divided key generated from an original key is given;

FIG. 7 is a diagram showing an example of writing in a KV storage device;

FIG. 8 is a diagram showing an example of a key table;

DETAILED DESCRIPTION

According to one embodiment, a data processing device, includes: a request receiver, a buffer, a first circuitry and a second circuitry. The request receiver receives a write request containing a first key and first data. The buffer temporarily buffers the first data contained in the write request. The first circuitry, according to a buffering status of the first data in the buffer, reads second data which is partial data of the first data that is not read yet out of the first data buffered in the buffer and generates a second key according to a position of the second data in the first data, based on the first key. The second circuitry associates a data structure containing the second data with the second key and adds the data structure into a data structure set whose elements are associated with second keys.

Embodiments of the present invention will be described below with reference to the drawings.

Figure 1:
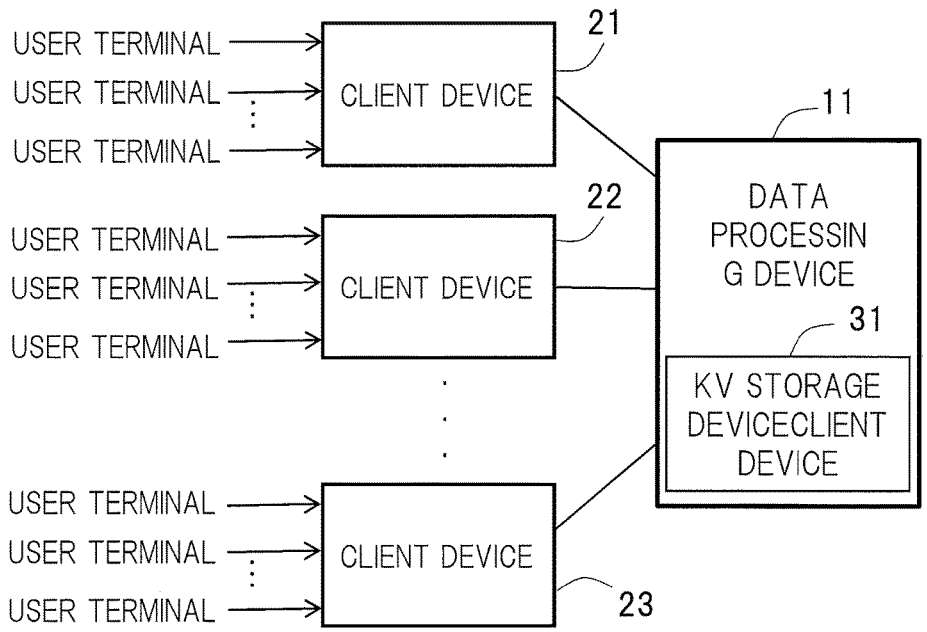
FIG. 1 is a diagram showing a data processing system in embodiments of the present invention.

FIG. 1 shows a data processing system in an embodiment of the present invention. The data processing system includes a data processing device 11, and a plurality of client devices 21 to 23. The data processing device 11 includes a KV (KeyValue) storage device 31.

The data processing device 11 is a key-value store device that receives write requests of key-values from the client devices 21, 22, and 23 over a network such as Ethernet. The client devices 21 to 23 are servers such as Web servers, each of which, in the case of Web servers, as an example, makes a write request of a key and a value (key-value) to the data processing device 11, with a URL being set as the key and content data such as a Web page being set as the value. The client devices 21 to 23 are connected to user terminals over a network such as the Internet, each of which, for example, upon receiving the specification of a URL and the write instruction of Web page data (content data) from a user terminal, generates a write request of a key-value and transmits the write request to the data processing device 11. The user terminal may be a terminal for an administrator of the Web servers. Upon receiving the write request of the key-value, the data processing device 11 causes the KV storage device 31 to perform write processing according to a first or second embodiment (to be described hereafter). When the write processing is completed, the data processing device 11 transmits a write completion response to the client devices 21 to 23.

In addition, upon receiving a browsing request of a Web page with a specified URL as a key from the user terminal, one of the client devices 21 to 23 generates a read request of a key-value with the specified key and transmits the read request to the data processing device 11. Upon receiving the read request from the client devices 21 to 23, the data processing device 11 causes the KV storage device 31 to perform read processing according to a third or fourth embodiment (to be described hereafter) based on the specified key, and transmits a response to the client devices 21 to 23.

Figure 2:
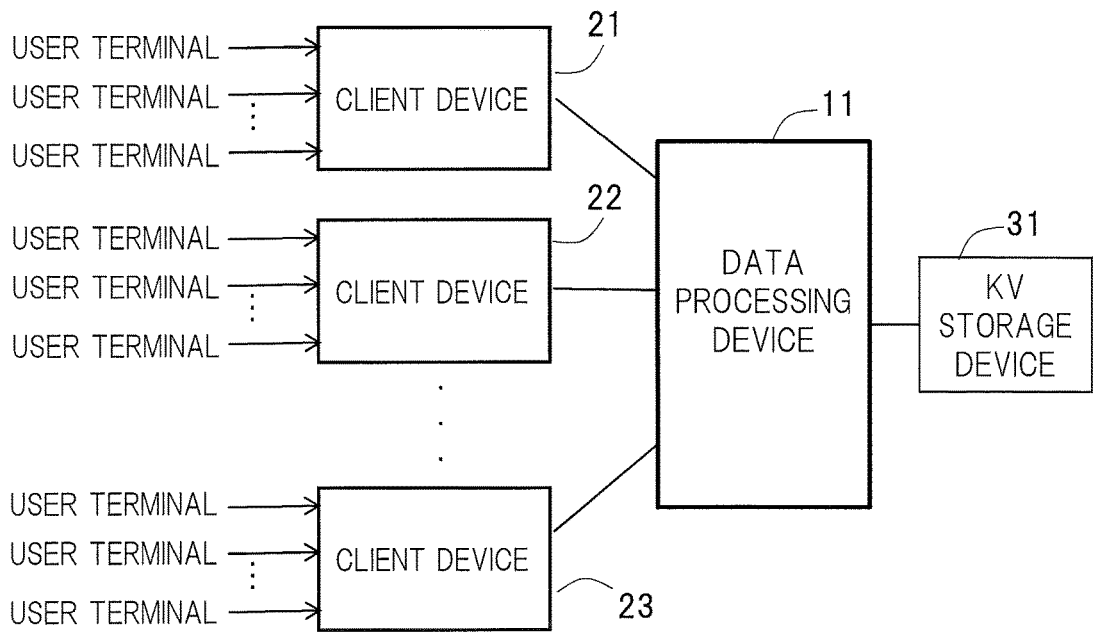
FIG. 2 is a diagram showing another example of the data processing system in the embodiments of the present invention.

The KV storage device is disposed inside the data processing device 11 in FIG. 1, but as shown in FIG. 2, the KV storage device 31 may be externally attached to the data processing device 11 via an internal bus. Alternatively, the KV storage device 31 may be connected to the data processing device 11 over a network such as Ethernet.

The data processing device 11 has a typical form that is formed by a CPU, memory, storage, network interface, and the like. Some of the functions thereof may be implemented by dedicated hardware such as an FPGA and ASIC. The data processing device 11 has both a writing function and a reading function but may have only one of the functions.

First Embodiment

Figure 3:
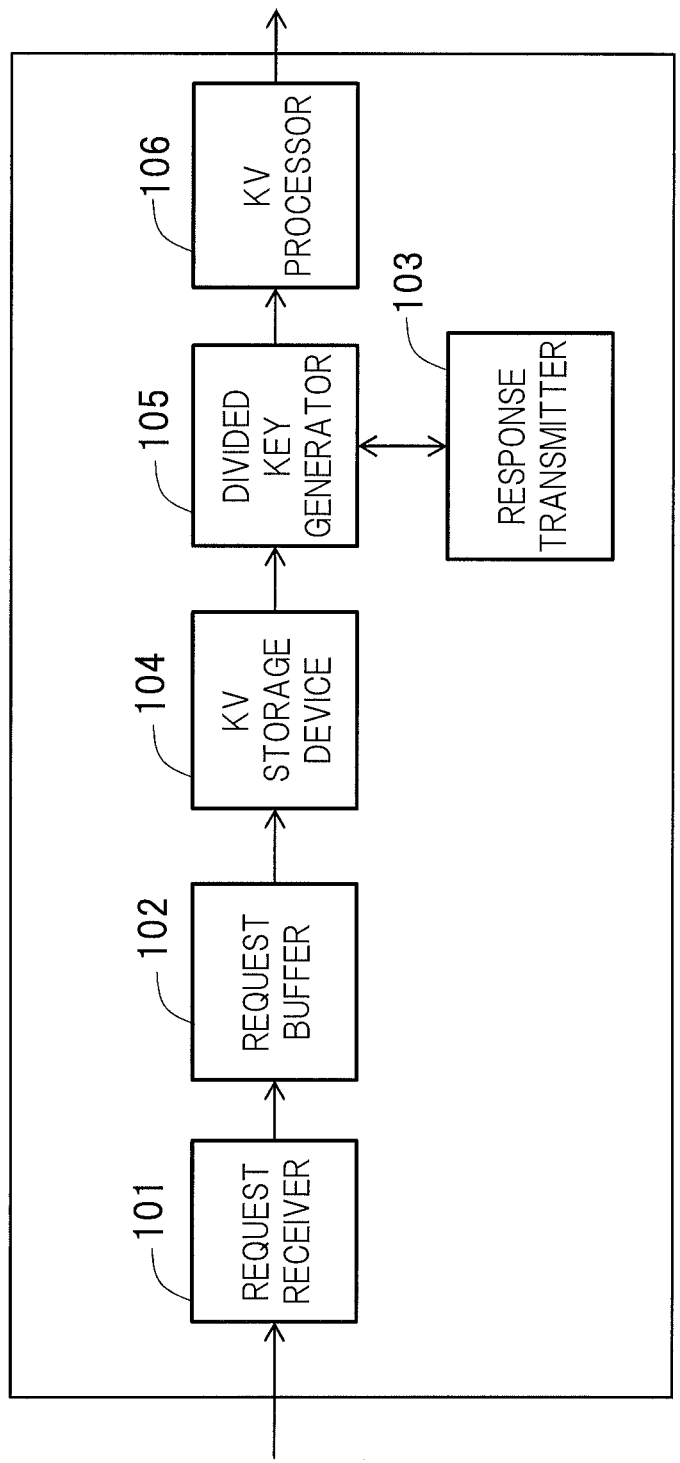
FIG. 3 is a diagram showing a data processing device in a first embodiment of the present invention.

FIG. 3 shows a data processing device in a first embodiment of the present invention. The data processing device in FIG. 3 is a data processing device having a configuration relating to the writing function out of the writing and reading functions that the data processing device 11 shown in FIG. 1 or FIG. 2 has. A data processing device having a configuration relating to the reading function will be described in an embodiment to be described hereafter. By combining the embodiments to be disclosed in the present specification, it is possible to implement a data processing device having a configuration relating to both the writing function and the reading function, like the data processing device 11 shown in FIG. 1 or FIG. 2.

As shown in FIG. 3, the data processing device includes a request receiver 101 that receives a write request of a key-value containing a key (first key) and a value (first data), a request buffer (buffer) 102 that temporarily buffers the received write request, a divided key generator (key generator) 104 that extracts a piece of partial data of the value as a divided value (second data) from the request buffer 102 and generates a divided key (second key) that is a key with respect to the divided value, a KV storage device (storage device) 103 in which data is stored, a KV processor 105 that writes a data structure containing a divided key and a divided value to the KV storage device 103 and sets the divided key and the write address of the data structure to a piece of correspondence information, and a response transmitter 106 that transmits the completion response of the write request. The KV storage device 103 is disposed inside the data processing device in FIG. 3, but the KV storage device 103 may be connected from the outside via an internal bus or a network, like the KV storage device in FIG. 2. The request receiver 101, a KV processor 105, a divided key generator 104 and a response transmitter 106 can implemented by circuitry such as a processor or an integrated circuit. Each circuitry which implements the request receiver 101, a KV processor 105, a divided key generator 104 and a response transmitter 106 may be different physical circuitry or all or a part of them may be same physical circuitry. The request buffer 102 may be configured by any storage device such as a memory or storage. The memory may be volatile memory such as SRAM or DRAM, or non-volatile memory such as NAND, FRAM or MRAM.

The storage may generally be any device which can memorize data permanently such as an HDD, an optical disc or SSD. The term "circuitry" may indicate one circuit, a plurality of circuits, or a system of circuits. Hereafter, the units of the data processing device will be described in further detail.

The request receiver 101 receives a write request of a key-value from a client device over a network such as Ethernet. The write request contains a header, a key (first key), and a value (first data) which is data to be written. The header contains the identifier of a request type which is a write request, and information on the length of the key and the value. The write request requests the key-value (or the value) contained in the write request to be written. The write request is formed as a message under a communications protocol such as TCP/IP and UDP/IP, for example, formed as a message under a protocol such as memcached. The write request is transmitted or received by one or more packets.

The request buffer 102 once buffers the write request received by the request receiver 101. More specifically, the message of the write request is, as described above, divided into one or more packets and transmitted one by one, and thus the buffering of the write request is gradually performed. The configuration of the write request has a header, a key, and a value that are disposed in order from the head thereof, and thus the buffering is also performed in this order. Although the packets do not always arrive in sequential order, they are subjected to sequence control under TCP and stored in the request buffer 102 in the above order. That is, a byte sequence of the header, key, and value is sequentially stored from the head in this order. Note that a configuration is also possible in which the header is stored in a storage device (e.g., memory) different from the request buffer 102. In addition, a configuration is also possible in which not only the header but also the key is stored in a memory device (e.g., memory) different from the request buffer 102.

The KV storage device 103 is a storage device that is formed by a volatile or nonvolatile memory, a storage, or both of them. The KV storage device 103 is formed by, for example, a DRAM, an SSD, an HDD, or the like. The KV storage device 103 may be formed by both a DRAM and an SSD, or both a DRAM and an HDD. The memory may be, rather than a DRAM, other memories such as an SRAM, an MRAM and an FRAM.

Figures 4, 5:
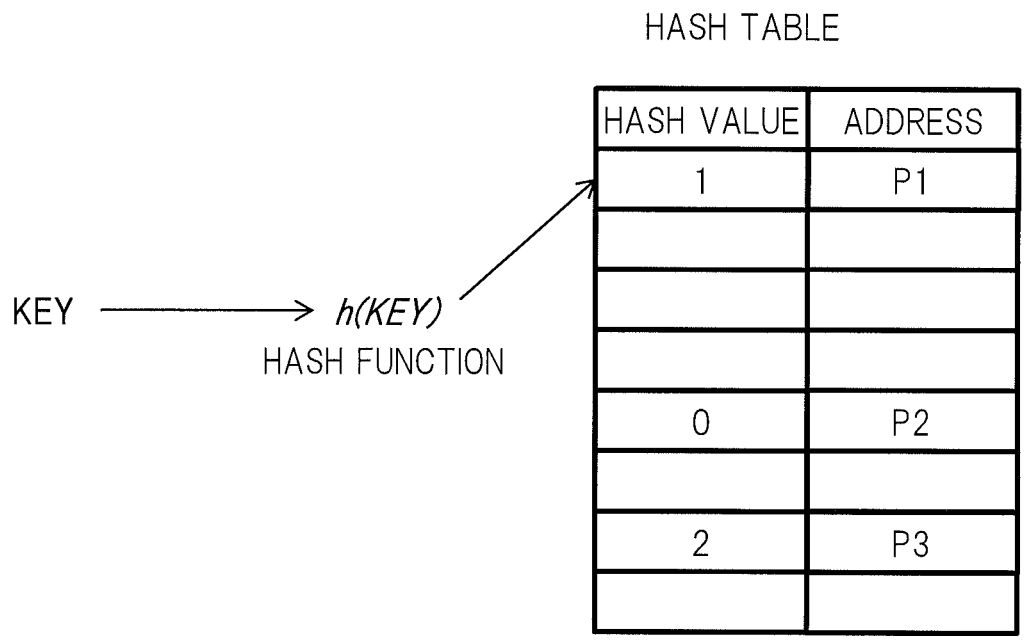
FIG. 4 is a diagram showing an example of a hash table.
FIG. 5 is a diagram showing an example of a key table.

The KV processor 105 performs so-called key-value store processing. Two representative examples of the form of key-value store processing will be described. The description will be made here taking an example of reading with respect to a key given by a read request, but writing with respect to a key given by a write request can be similarly performed. As an example, as shown in FIG. 4, a hash table is prepared for associating a hash value with an address in a data storage area of the KV storage device 103. In this case, the hash table is stored in a management area of the KV storage device 103. A hash value corresponding to a specified key is calculated by a hash function h( ), and an address corresponding to the calculated hash value is obtained from the hash table. Based on the obtained address, the data storage area is accessed to read a key-value. This method enables high-speed accesses. Alternatively, as shown in FIG. 5, a key table is prepared for associating a key with an address. The key table contains a data structure to manage keys in a dictionary order. An address corresponding to the specified key is obtained from the key table, and the data storage area is accessed based on the obtained address to read a corresponding key-value. In addition, by having the above-described data structure that manages keys in a dictionary order, it is possible to respond to a read request that requests a read of a key-value corresponding to a key previous or next to a specified key. Two representative examples of the form of key-value store processing have been described here, but forms other than those described here are possible, and the present embodiment does not limit the forms or algorithms of key-value store processing itself.

The divided key generator 104 monitors how many bytes of data are buffered in the request buffer 102. The divided key generator 104 extracts a partial data of the value that has not been extracted from the request buffer 102 yet from the head side, according to the buffering status of the request buffer 102, more specifically, the size of the buffered value (or the size of the key-value). For example, the partial data of the value is extracted every time a certain size is reached from the head of the value. Extracting the partial data of the value may be referred to as value division, and the extracted partial data may be referred to as a divided value. As described above, the header of the write request contains information on the size of a key and the size of a value. Therefore, by using the header, the head positions of both the key and the value can be identified from the data buffered in the request buffer. Note that, as described above, the header itself may be buffered in the request buffer 102 or may be stored in a separate storage device such as a memory. Hereafter, a key that has been contained in a write request may be referred to as an original key, and a value that has been contained in the write request may be referred to as an original value.

The divided key generator 104 generates, using the original key, a key (referred to as a divided key) to be given to a divided value. In more detail, the divided key is generated according to the position of the divided value in the original value. The divided key generator 104 passes these divided key and divided value (may be referred to as a divided key-value) to the KV processor 105. At this point, additional information containing information on the total length of the original value is passed to the KV processor 105. The additional information may contain information on the length of the divided value. At the time of passing the divided key-value to the KV processor 105, the divided key generator 104 frees a buffer area where the divided value is stored (a buffer area where the header and the key have been stored may be freed at the time when they become unnecessary to be stored in the buffer area) to prepare for receiving the remaining parts of the value. However, even if the buffer is freed, the detail of the request (e.g., the total length size of the value contained in the header) and the original key are necessary to generate a subsequent value division and a divided key, and thus they are held in an optional or predetermined area in the request buffer 102, or a separate storage unit such as a memory.

Thereafter, the request buffer 102 gradually receives unreceived remaining parts of the value, identifies unread partial data of the value from the head side according to the buffered size, and extracts the identified partial data (divided value) from the request buffer 102. A divided key corresponding to the second divided value from the held key is generated, and the divided value and the divided key (divided key-value) are passed to the KV processor 105. Note that, as to the second and subsequent divided key-values, additional information containing information on the total length of the value that has been contained in a header may be passed to the KV processor 105. In addition, the additional information may contain information on the length of the relevant divided value.

FIG. 6 schematically shows an example in which an original value is divided into three parts (simply expressed as VALUE1/3, VALUE2/3, and VALUE3/3, respectively), and they are given divided keys (KEY0, KEY1, and KEY2) generated from the original key (KEY). In this example, the original value is divided from the head every certain size.

A method of dividing a value will be described in further detail. As described above, a conceivable division of the value is, for example, to extract a certain size (e.g., 4 Kbytes) of partial data of the value as of the point in time when a buffered size reaches the size from the head of the original value. In this case, thereafter, every time buffered data reaches 4 Kbytes, a 4 Kbytes of partial data is extracted. If the tail of the value is reached, a value containing the tail is extracted even if it is less than 4 Kbytes.

The division size of the value here is a certain size from the head of the value, but is not necessarily a certain size and may be variable-length as long as the value of a divided key is allowed to uniquely identify a byte position at which a divided value is in the whole original value. For example, a division size may differ in every division. When the size of division is made to be variable-length, the size of division may be changed according to the speed of buffering. For example, the size of division may be increased or decreased for a faster buffering speed. Alternatively, the criterion of division may be the head of an original key, rather than the head of an original value. For example, bytes may be counted from the head of the key of a key-value, and a value may be divided every time a certain size is reached. In such a manner, the dividing method itself is not limited to specific methods.

Here, a method of generating a divided key will be described. The divided key is generated using an original key. For example, if a key is "ABC," a divided key for a divided value obtained at the first time is generated as "ABC0" by adding an identifier 0 thereto. For a divided value obtained in the second time, a divided key is generated, for example, as "ABC1" by adding the next identifier 1. In such a manner, a divided key can be generated by coupling an original key and an identifier to identify the position of each divided value in the whole original value. Here, the divided key is generated by appending the identifier to the original key, but the identifier may be prepended thereto, or may be inserted in the middle of the character string of the original key. In addition, an identifier to be coupled is not necessarily a number and may be an alphabet character or the other symbol.

Generating a divided key by adding an identifier to an original key using the above-described method involves the risk of making a write request having the same key to begin with and they may be confused. For example, the previously described example is "ABC0," but a write request of a key-value with exactly the same key "ABC0" specified may come from a client device. These need to be distinguished even in this case. Thus, this problem can be solved by employing a method in which the divided key generator 104 always adds a fixed-length identifier. For example, assuming that the fixed length is 1 byte, if a write request of a key-value with a key of "ABC0" specified is received from a client device, the divided key generator generates the first divided key, like "ABC00," by appending a fixed-length identifier 0 to the original key thereof. The second divided key is generated, like "ABC01," by similarly appending a fixed-length identifier 1 to the original key. By making an identifier to be added fixed-length and always adding the identifier in such a manner, it is possible to internally make discrimination in such a manner that the last 1 byte is always an identifier, and a part antecedent thereto is an original key, which causes no confusion. Note that, to secure more identifiers, the number of digits of an identifier may be any number of digits more than 1 byte. Furthermore, the method is not limited to such a method in which a fixed-length identifier is always added (fixed-length identifier method) but may be any other method.

The KV processor 105 receives the divided key-value and the additional information from the divided key generator 104, generates header information from the additional information, generates a data structure containing the header information and the divided key-value, and writes the data structure to a free space in the data storage area of the KV storage device 103. The header information may be the additional information itself or may be generated by extracting a portion of information from the additional information.

Note that storing the header information is dispensable, and in the case of not storing the header information, a configuration is possible in which the divided key generator 104 does not pass the header information to the KV processor 105.

FIG. 7 shows an example of writing to the KV storage device 103. A data structure containing header information HDR0 and a divided key "ABC0," and the first divided value (VALUE1/3) is stored from an address P1-1. In addition, a data structure containing header information HDR1, a divided key "ABC1," and the second divided value (VALUE2/3) is stored from an address P1-2 that is next to the tail address of the divided value (VALUE1/3). In addition, a data structure containing header information HDR2, a divided key "ABC2," and the third divided value (VALUE3/3) is stored from an address P1-3 that is next to the tail address of the divided value (VALUE2/3).

In addition, the KV processor 105 registers the correspondence between a divided key and an address at which a data structure is stored in correspondence information that is held in the management area in the KV storage device 103. As described above, methods of key-value store processing include various methods such as one using hash and one using a key table based on a dictionary, and FIG. 8 shows an example of the correspondence information (key table) in the latter case. Corresponding to the writing example shown in FIG. 7, "ABC0," "ABC1," and "ABC2" are registered as divided keys. In addition, addresses at which the pieces of data (data structures) corresponding to the divided key are stored are registered as "P1-1," "P1-2," and "P1-3" in the correspondence information. In this manner, KV storage device 103 retains a data structure set whose elements (i.e., data structures) are associated with a plurality of divided key, via the correspondence information. KV processor 105 additionally writes (i.e., adds) the generated data structure into the data structure set and the added data structure is associated with the divided key registered in the correspondence information.

In the example shown in FIG. 7 and FIG. 8, the header information is stored in the same data storage area as that of the divided key-value, but the header information may be registered in the key table (correspondence information).

In addition, the registration of the header information itself can be omitted from both the data storage area and the key table. In addition, a configuration is possible in which header information (e.g., the total length size of the original value) is held for only the first divided key-value, and holding header information is omitted for the second and subsequent divided key-values.

When the processing of the write request received from the client device is completed, the response transmitter 106 transmits a write completion response to the client device. That is, the processing of the write request is completed when the generation of the divided key-value by the divided key generator 104 and the writing of a data structure containing a divided key-value to the KV storage device 103 by the KV processor 105 are repeatedly performed, the tail of a value that is requested to be written is finally received, and the writing of a data structure containing the last divided key-value to the KV storage device 103 is finished. At this point, upon receiving a completion notification of the processing of the write request from the KV processor 105, the response transmitter 106 transmits the write completion response to the client device.

The above description has been made taking the example in which the total length of an original value is longer than a fixed length using as a division size, but it should be understood that a write request containing a value having a length shorter than the fixed length can be similarly processed. In that case, the division of the value is not performed, the whole original value is transmitted to the KV processor 105 together with an original key and additional information (e.g., information on the total length of the value). Then, a data structure based on them is written to the KV storage device 103. When the writing is completed, the response transmitter 106 transmits a response to the client device. However, when the above-described fixed-length identifier method is used, a key obtained by adding a fixed-length identifier to an original key is generated, and instead of the original key, a key to which the fixed-length identifier is added is transmitted to the KV processor 105.

Figure 9:
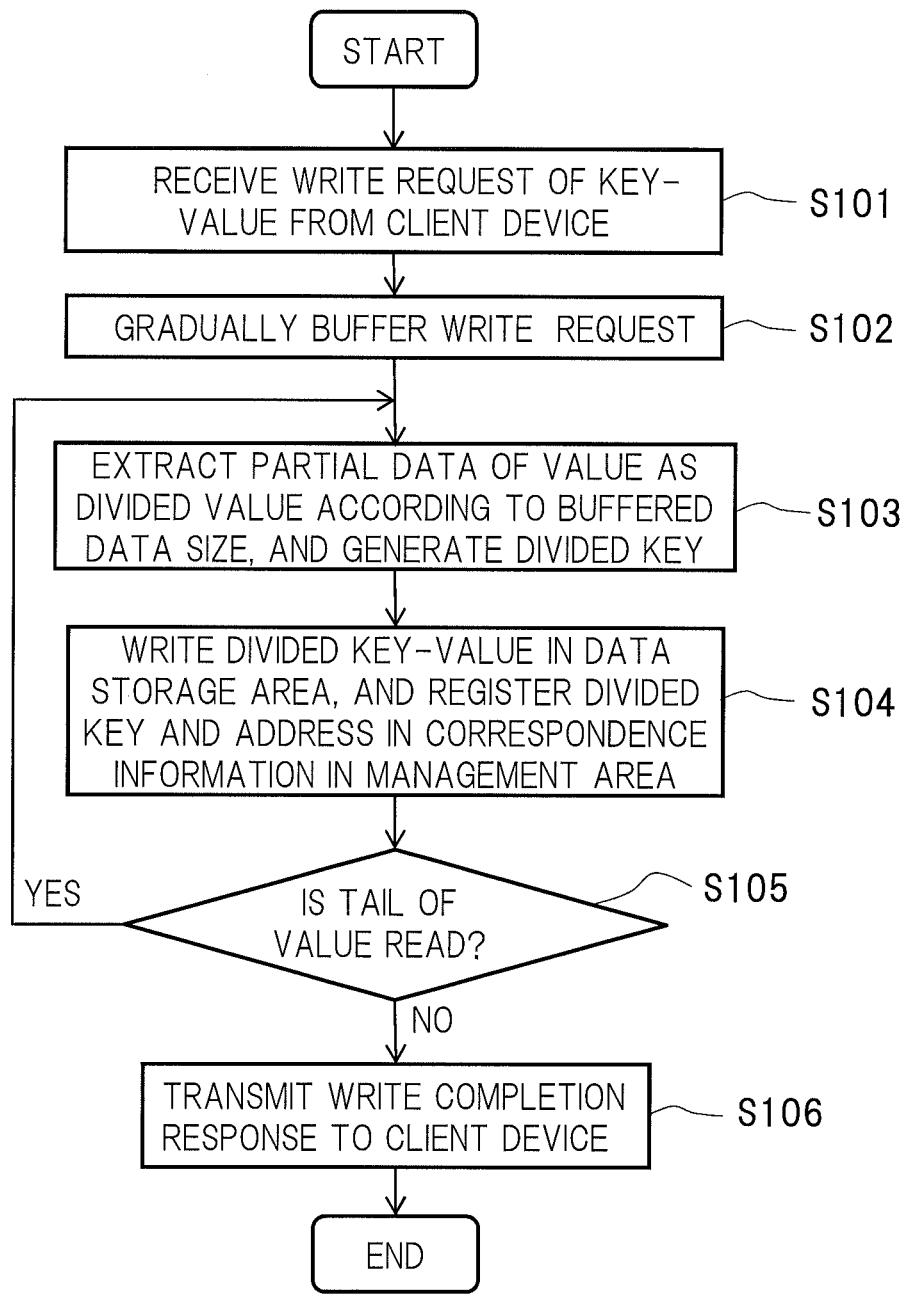
FIG. 9 is a flow chart of an operation example in the first embodiment.

FIG. 9 shows a flow chart of an operation example in the present embodiment. First, the request receiver 101 receives a write request of a key-value from a client device in the form of one or more packets (S101). The request buffer 102 buffers therein the write request received by the request receiver 101 (S102). The write request contains a header, a key (actual data on the key), and a value (data to be written). The header contains information on the lengths of the key and the value.

The divided key generator 104 extracts partial data of the value that has not been extracted from the request buffer 102 yet as a divided value from the head side of the value according to the buffering status of the request buffer 102, more specifically, the size of the buffered data. Then, a divided key corresponding to the divided value is generated based on the key (original key) contained in the write request (S103). The KV processor 105 writes a data structure containing the divided key and the divided value to the data storage area of the KV storage device 103. The data structure may contain header information containing any one of the total length size of the original value and the size of the divided value, and the like. In addition, the divided key (or its hash value) and an address at which the data structure is written are registered to correspondence information existing in the management area of the KV storage device 103. Note that a buffer area in the request buffer 102 where the divided value or the like is stored may be freed.

The divided key generator 104 determines whether the reading of the tail of the value from the request buffer 102 is completed, that is, whether a value part to be extracted still exists, and if the reading of the tail of the value is not completed (i.e., a value part to be extracted still exists), the flow returns to step S103. If the reading of the tail of the value is completed, the divided key generator 104 determines that the processing of the write request is completed and notifies the response transmitter 106 of a completion signal.

The response transmitter 106 that receives the completion signal transmits a write completion response to the client device that has transmitted the write request (S106).

Note that, in the present embodiment, a key (divided key) is added for each divided value, and thus there is a problem in that the amount of keys (divided keys) to be stored in the data storage area of the KV storage device 103 is increased as compared with conventional configurations. To mitigate the problem, a plurality of storage devices of different bit costs, for example, a DRAM and an SSD, an SSD and an HDD, or the like may be included as the KV storage device 103. In general, a storage device of a higher bit cost has a higher access speed, and a storage device of a lower bit cost has a lower access speed. Thus, data structures relating to some divided keys may be stored in a storage device having a higher access speed while its bit cost is high, and data structures relating to the remaining divided keys may be stored in a storage device of a lower bit cost while its access speed is low.

For example, a data structure relating to a divided key (the first divided key) having an identifier 0 is stored in a storage of a higher speed, and data structures relating to divided keys (the second and subsequent divided keys) having the other identifiers are stored in a storage that is of a lower speed but low-cost. According to this, it is possible to hold down the storage cost of a divided key that increases when a large-sized key-value is stored while maintaining the response speed of a key-value read request relating to an undivided value having a small size (having a demand for a higher response speed).

In addition, if the KV processor 105 performs a hash-based key-value store processing (refer to FIG. 4), a hash table to store an entry relating to the divided key (the first divided key) having the identifier 0 may be disposed in, for example, a DRAM, which is high-speed, and a hash table to store entries relating to divided keys (the second and subsequent divided keys) having the other identifiers may be disposed in an SSD. In the case of, rather than the hash-based, a key table to store keys in a dictionary order (refer to FIG. 5), the disposition of the tables can be similarly separated into a DRAM and an SSD.

As described above, according to the present embodiment, without buffering the whole value that is requested to be written, the received value is buffered one by one and pieces of partial data are extracted one by one from the head side of the value as divided values. Then, a divided key is generated for the extracted divided value, and a data structure containing the divided value is written in the KV storage device 103 being associated with the divided key. According to this, it is possible to hold down the buffer size of the request buffer 102 because the value can be written without waiting for all the pieces of data on the value to be buffered.

In addition, according to the present embodiment, it is possible to perform operations concurrently among a plurality of write requests in units of divided key-value. For example, when the writing of a data structure relating to the Nth (N is an integer equal to or more than one) divided key is completed about a certain write request, the operation can be performed while being switched to the other write request and then returned to the original write request to write a data structure relating to the (N+1)th divided key. Therefore, a write request specifying a large-sized value does not cause a long wait for performing the other write request, and then delays in writing can be stabilized.

(First Modification)

The above-described embodiment has been described about the case where header information in a data structure contains size information on the whole original value, size information on a divided value, or the like, but the header information may further contain subsequent data presence distinguishing information on whether a divided value in the data structure has a subsequent piece of data, that is, whether the divided value contains the tail of the original value. In this case, the divided key generator 104 determines whether a divided value that is read this time has a succeeding data (whether the divided value read this time contains the tail of the original value) and passes subsequent data presence distinguishing information containing a value corresponding to a determination result to the KV processor 105. The KV processor 105 causes the header information to contain the subsequent data presence distinguishing information and generates a data structure based on the header information, the divided value, and the like. This subsequent data presence distinguishing information can be used in read processing that is performed when a read request of the original value is received.

(Second Modification)

The first modification has been described about the case where the header information contains the subsequent data presence distinguishing information, but as another example, header information in a data structure of a divided value that is first read from the request buffer 102, that is, a divided value containing the head of the original value may contain information indicating the division count of the original value (or the number of reads). The division count of the original value can be calculated based on the size information on the original value. For example, if a division unit is a certain size from the head of the original value, the division count can be calculated based on a value of division and a remainder obtained by dividing the size of the original value by the certain size, in such a manner as to be the value of division if the remainder is zero, or a value obtained by adding one to the value of division if the remainders greater than zero. Note that, as to divided values that are read in the second and subsequent times, information on the division count may not be contained in the headers thereof. This information on the division count (the number of reads) can be used in read processing performed when a read request of the original value is received.

(Third Modification)

The above-described embodiments have been described assuming that the byte sequence of a value is stored in the request buffer 102 in order from the head of original value under TCP, but according to a position at which data in a received packet is in the original value, the byte sequence may be directly stored at a corresponding position in the request buffer 102 in an order of the arrival of packets (even if the previous pieces of data have not arrived). For example, the size of the original value may be specified from the header of a write request, a relative position at which data on the received packet is in the original value may be specified from the sequence number or the like of the received packet, and the data may be stored in the request buffer 102 according to the specified position. In the case where the division unit is fixed to a certain size, and the division is made every certain size from the head of the value, if data of the certain size becomes complete in division unit and data on the head side has not been read yet, the complete data (divided value) may be read to perform the subsequent processing. The divided key generator 104 may generate a divided key according to which number the read divided value from the head is.

Second Embodiment

In the first embodiment, when an original value requested by a write request is divided into a plurality of partial values (divided values), and data structures each containing a divided key and the divided value are to be gradually written in the KV storage device 103, the writing in the KV storage device 103 may be disabled in the middle due to a storage failure or the like. In that case, if a response of a write error is simply transmitted to a client device, the data structures that have been written thus far are left in the KV storage device 103 as useless data. In the present embodiment, a form that properly supports such an error processing.

Figure 10:
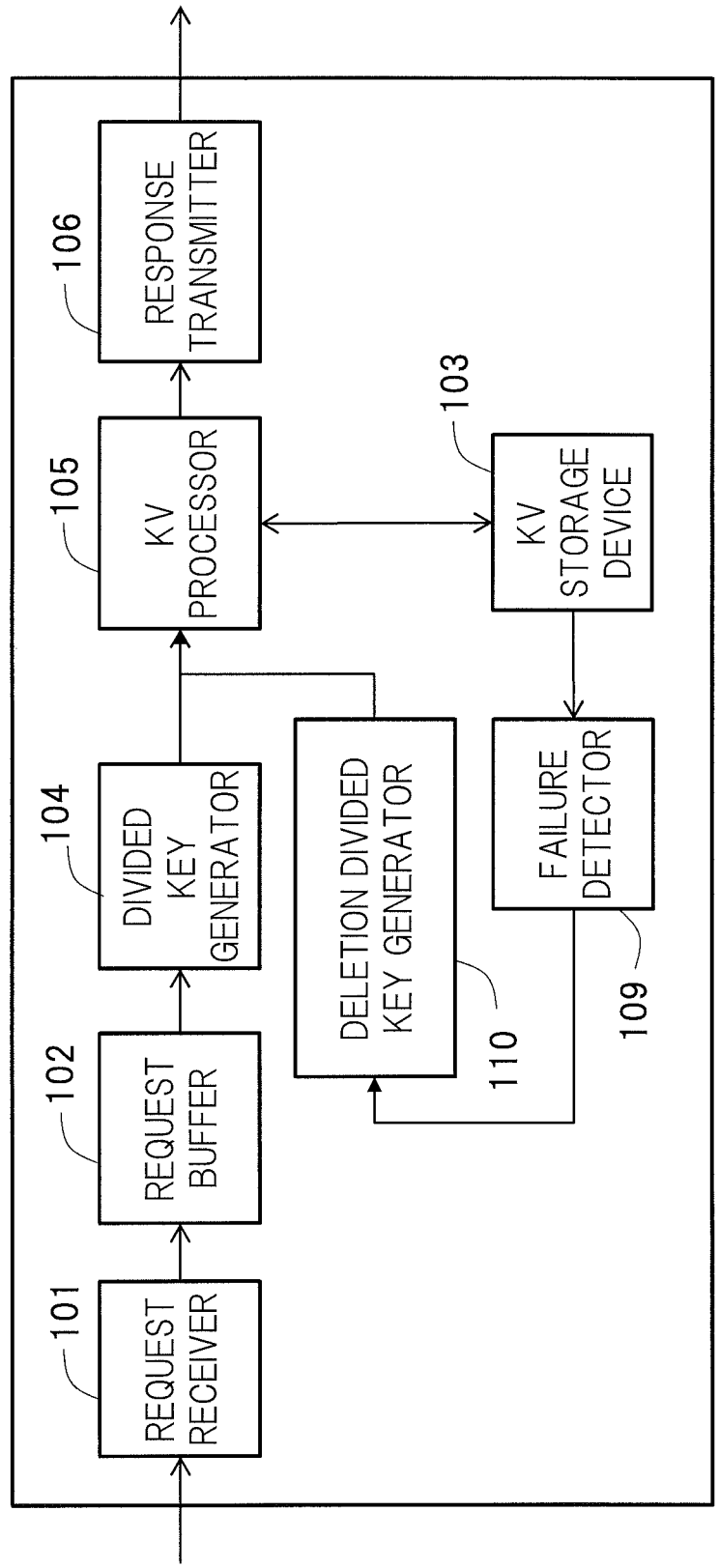
FIG. 10 is a block diagram of a data processing device in a second embodiment.

FIG. 10 shows a block diagram of a data processing device in a second embodiment. A failure detector 109 and a deletion divided key generator (deletion processor) 110 are added to the data processing device in the first embodiment. The failure detector 109 and the deletion divided key generator 110 can implemented by circuitry such as a processor or an integrated circuit.

The failure detector 109 detects a failure in the KV storage device 103 and notifies the deletion divided key generator 110 of failure detection. A method of detecting a failure may be optional, but for example, the KV processor 105 may monitor a response to a write request of a data structure in the KV storage device 103 and may detect a failure if no response is transmitted or an error signal is transmitted as a response. In addition, in the case where a failure occurs, the KV storage device 103 may be configured to output a signal indicating that the failure occurs, and this signal may be detected. In addition, it may be determined that a failure occurs if it is detected that the power of the KV storage device 103 is turned off.

The deletion divided key generator 110, when receiving the notification of failure detection from the failure detector 109, generates a divided key to delete a data structure that has been written thus far in the KV storage device 103 in conjunction with a relevant write request. To generate a divided key, the deletion divided key generator 110 acquires information on an original key and the number of divisions of a value that has been made thus far from the divided key generator 104 and generates divided keys of the number of divisions from the original key. The deletion divided key generator 110 passes a deletion command of data structures to which the respective divided keys are specified to the KV processor 105. The KV processor 105 deletes the data structures corresponding to these divided keys from the KV storage device 103 accordingly. When completing the deletion, the KV processor 105 transmits an error notification to the response transmitter 106, and the response transmitter 106 transmits a response indicating the write error to a client device.

For example, assume that, in the case where an original value is divided into ten divided values, the failure detector 109 detects a failure in the KV storage device 103 after write processing of six data structures each containing one of first six divided values. At this point, the deletion divided key generator 110 generates divided keys thus far, for example, six divided keys from "ABC0" to "ABC5" assuming that the original key is "ABC" and identifiers each have a fixed length of 1 byte, and passes a deletion command of data structures to which the divided keys are specified to the KV processor 105. The KV processor 105 deletes the data structures corresponding to these divided keys from the KV storage device 103 accordingly. When completing the deletion, the KV processor 105 transmits an error notification to the response transmitter 106, and the response transmitter 106 transmits a response indicating the write error to a client device.

In the above-described description, the deletion divided key generator 110 acquires information on an original key and the number of divisions from the divided key generator 104 and generates divided keys, but the other methods may be used as long as divided keys can be generated by the methods. For example, the deletion divided key generator 110 may acquire the information on the number of divisions by counting the number of times divided keys have been transmitted from the divided key generator to the KV processor 105 thus far with respect to a write request in question. Alternatively, without using information on the number of divisions, the deletion divided key generator 110 may generate divided keys one by one from the first one from an original key, instruct deletion to the KV processor 105, and generate divided keys until the KV processor 105 transmits a response indicating that there is no corresponding divided key. Note that a generating algorithm of divided keys is assumed to be set in advance and common to the deletion divided key generator 110 and the divided key generator 104. Alternatively, the deletion divided key generator 110 may read and accumulate the very divided keys transmitted from the divided key generator 104 to the KV processor 105, and when notified of a failure detection, may use the very divided keys that have been accumulated thus far with respect to a write request in question. In this case, when the processing of the write request is completed, the accumulated divided keys may be deleted.

As described above, according to the present embodiment, if failure occurs in the KV storage device 103 in the middle of write processing, it is possible to correctly delete data structures that have been written thus far, which can solve the problem that useless pieces of data are left as garbage in the KV storage device 103 when a failure occurs.

Third Embodiment

Figure 11:
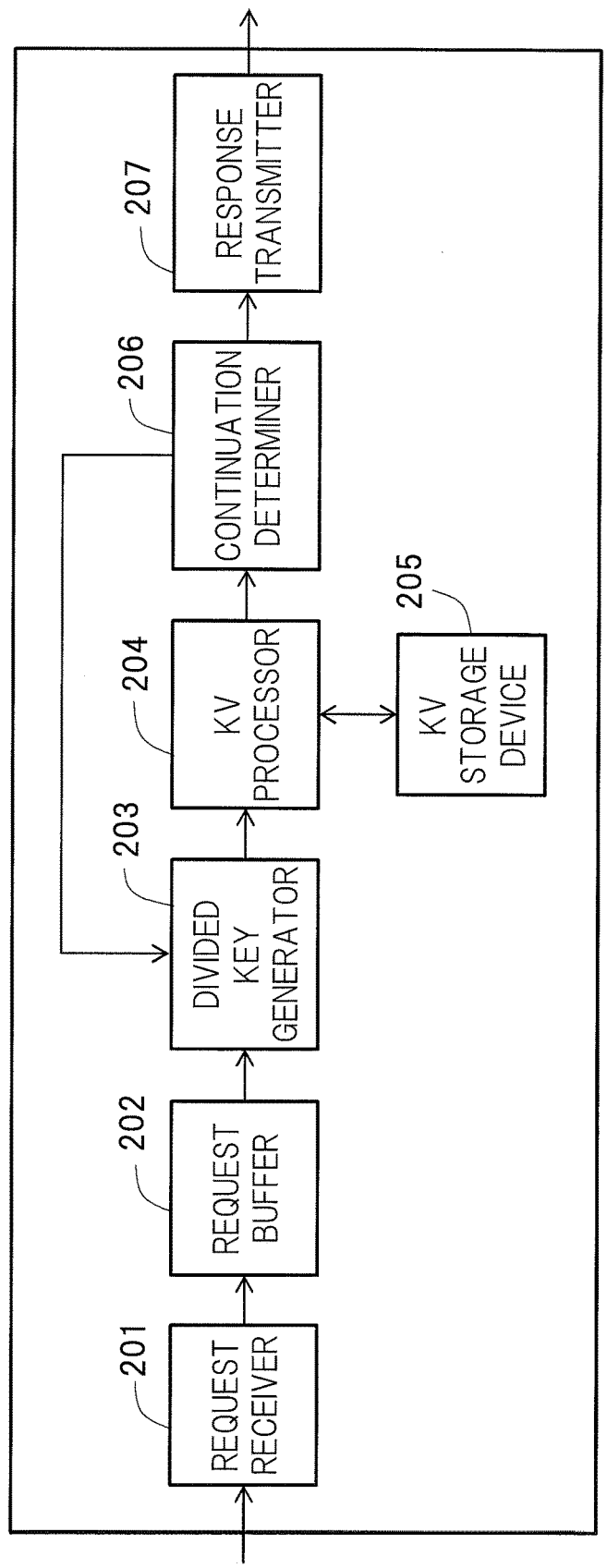
FIG. 11 is a block diagram of a data processing device in a third embodiment.

FIG. 11 shows a block diagram of a data processing device in a third embodiment. The first and second embodiments have been described about the data processing devices that allow the writing operation, and here will be described a data processing device that allows reading operation.

The data processing device includes a request receiver 201 that receives a read request of a key-value or a value (first data) containing a key (first key), a request buffer 202 that temporarily buffers the received read request, a divided key generator 203 that generates a divided key from a key (original key) specified by the read request extracted from the request buffer 202, a KV storage device 205 in which data (e.g., data structure, table) is stored, a KV processor 204 that reads a value (or a divided value if the original value is divided) corresponding to the divided key from the KV storage device 205, a continuation determiner 206 that determines whether a subsequent divided value exists (i.e., whether a divided value containing the tail of the original value is read), and a response transmitter 207 that transmits a response based on a value (or a divided value if the original value is divided) read by the KV processor 204.

A request receiver 101, a request receiver 201, a divided key generator 203, a KV processor 204, a continuation determiner 206 and a response transmitter 207 can implemented by circuitry such as a processor or an integrated circuit. Each circuitry which implements a request receiver 101, a request receiver 201, a divided key generator 203, a KV processor 204, a continuation determiner 206 and a response transmitter 207 may be different physical circuitry or all or a part of them may be same physical circuitry. The request buffer 202 may be configured by any storage device such as a memory or storage. The memory may be volatile memory such as SRAM or DRAM, or non-volatile memory such as NAND, FRAM or MRAM. The storage may generally be any device which can memorize data permanently such as an HDD, an optical disc or SSD. The term "circuitry" may indicate one circuit, a plurality of circuits, or a system of circuits.

Note that the KV storage device 205 may be the same as the KV storage device 103 on which the writing is performed by the writing function of the data processing device in FIG. 3 or the like. In FIG. 11, the KV storage device 205 is disposed inside the data processing device, but as with the KV storage device in FIG. 2, the KV storage device 205 may be connected from the outside via an internal bus or a network. Hereafter, the units of the data processing device will be described in further detail.

The request receiver 201 receives a read request of a key-value from a client device over a network such as Ethernet. The message of the read request contains a header, a key (original key), and the like, and reading of a value corresponding to the original key is requested. The header contains the identifier of a request type being a read request and may contain the identifier of a transmission source, or the like. The read request is formed as a message under a communications protocol such as TCP/IP and UDP/IP, for example, formed as a message under a protocol such as memcached.

The request buffer 202 once buffers the read request received by the request receiver 201. At least the key contained in the read request is buffered. A configuration is possible in which the header is stored in a storage device (e.g., memory) different from the request buffer 202. In this case, the key needs to be associated with the header.

The KV storage device 205 is a storage device that is formed by a volatile or nonvolatile memory, a storage, or both of them. The KV storage device 205 is formed by, for example, a DRAM, an SSD, an HDD, or the like. The KV storage device 205 may be formed by both a DRAM and an SSD, or both a DRAM and an HDD. The memory may be, rather than a DRAM, other memories such as an SRAM, an MRAM and an FRAM.

The KV processor 204 is a function unit that performs so-called key-value store processing (processing here relating to a reading function). As with the first embodiment, there are a hash-based form using a hash table, and a form using a key table having a data structure in which keys are arranged and managed in a dictionary order. The operation has been described in detail in the first embodiment and will not be described.

The divided key generator 203 generates a divided key (second key) from a key (original key) specified by the read request extracted from the request buffer 202. In more detail, the divided key is generated according to a position of a divided value to be read using the divided key in an original value, or the number of reads (one at first). The divided key generator 203 makes the read request of a value (or a divided value if the original value is divided) to the KV processor 204 specifying the divided key. The divided key generator 203 has a divided key generating algorithm similar to that of the divided key generator 104 of the data processing device having the writing function and generates the divided key under the algorithm.

For example, assuming that the generating algorithm of a divided key is of a scheme similar to that in the first embodiment, the divided key generator 203 at first adds an identifier 0 to the original key to generate a divided key, and makes a read request of a value (second data) to the KV processor 204 specifying the divided key. For example, a divided key of "ABC0" is generated for a key "ABC." The KV processor 204 reads a data structure that is associated with this divided key from the KV storage device 205, extracts a value (or a divided value if the original value is divided) from the data structure, and further extracts the total length of the original value stored in header information in the data structure together. The total length of the original value is, if the value corresponding to this divided key is a divided value, the total length of the value before the division (original value).

The continuation determiner 206 determines whether the value (or divided value) read from the KV storage device 205 has a subsequent divided value (i.e., the value (or divided value) contains the tail of the original value), from the total length of the original value acquired by the KV processor 204. If determining that the subsequent divided value exists, the continuation determiner 206 instructs the divided key generator 203 to generate the next divided key.

For example, assume that the maximum length of a divided value is 4 KB (the length of a divided value is equal to or less than 4 KB if containing the tail of the original, or otherwise 4 KB), the total length of the original value is 11 KB, and an identifier of the current divided key is 0. The maximum length of the value that has been read thus far is 4 KB×(0+1)=4 KB, which is less than 11 KB, and it is determined that a subsequent value exists (the reading must be continued). Note that a number on the left side in the parentheses (here, 0) denotes the number of reads by the previous time, and a number on the right side denotes a value (1) to be added to the number of reads by the previous time in the reading this time.

The instructed divided key generator 203 generates, in this case, a divided key "ABC1" to which the next identifier 1 is added and passes the divided key to the KV processor 204. Similarly, a value corresponding to the divided key "ABC1" is read. The maximum length of the value that has been read thus far is 4 KB×(1+1)=8 KB, which is less than 11 KB, and it is determined that the subsequent value (the reading must be continued). At the time when a divided value corresponding to a divided key "ABC2" is read, the maximum length of the value thus far is 4 KB×(2+1)=12 KB, which is equal to or more than 11 KB, and the continuation determiner 206 determines that the reading is no longer continued.

Note that, if a header in a data structure contains size information on a divided value, the continuation may be determined from the size information on divided values that have been read thus far, and the total length of the original value.

The response transmitter 207 transmits, every time a divided value is read, a response message containing the divided value. In the case where the response message has a header, the response message is transmitted in such a manner that, only at the first transmission of the divided value, the header of the response message is generated, and the header and a value that is read for the first time thereafter are successively contained. Note that the response message is transmitted in the form of a packet via a transmission buffer in the response transmitter 207. The transmission buffer is a buffer provided in the response transmitter 207, in which data to be transmitted is temporarily stored. Here, the header contains the total length of the value (original value) to be transmitted as a response. The key contained in the read request may be contained following the header. At the time of reading the first divided value, the total length of the original value is read together as header information, and thus the total length of the original value is acquired from this header information.

As to the subsequent divided values, every time a divided value is read, the response transmitter 207 transmits the divided value as it is in the form of a packet via the internal transmission buffer and frees the transmission buffer every time. The client device receives the response message and grasps the total length of the value from information on the total length of the value contained therein. The client device waits for value data to arrive until the sum of the lengths of the received divided values reaches the grasped total length of the value. The data processing device operates in such a manner as to transmits divided values one by one as a response, but to begin with, if the whole value is transmitted at once, the data thereof is transmitted being divided into, for example, 1.5 KB TCP/IP packets over a network, and thus the client device cannot basically distinguish the difference between these operations. For this reason, the fact that a value requested by the client device is transmitted while being divided in the data processing device is hidden from the client device.

Note that since the continuation determiner 206 knows how many subsequent divided values remain, the continuation determiner 206 may be configured to give an instruction to read remaining one or more divided values at once at the time when, for example, the first divided value is read rather than to give an instruction to read the next divided value one by one every time after the reading is finished. This enables an improved reading throughput.

Figure 12:
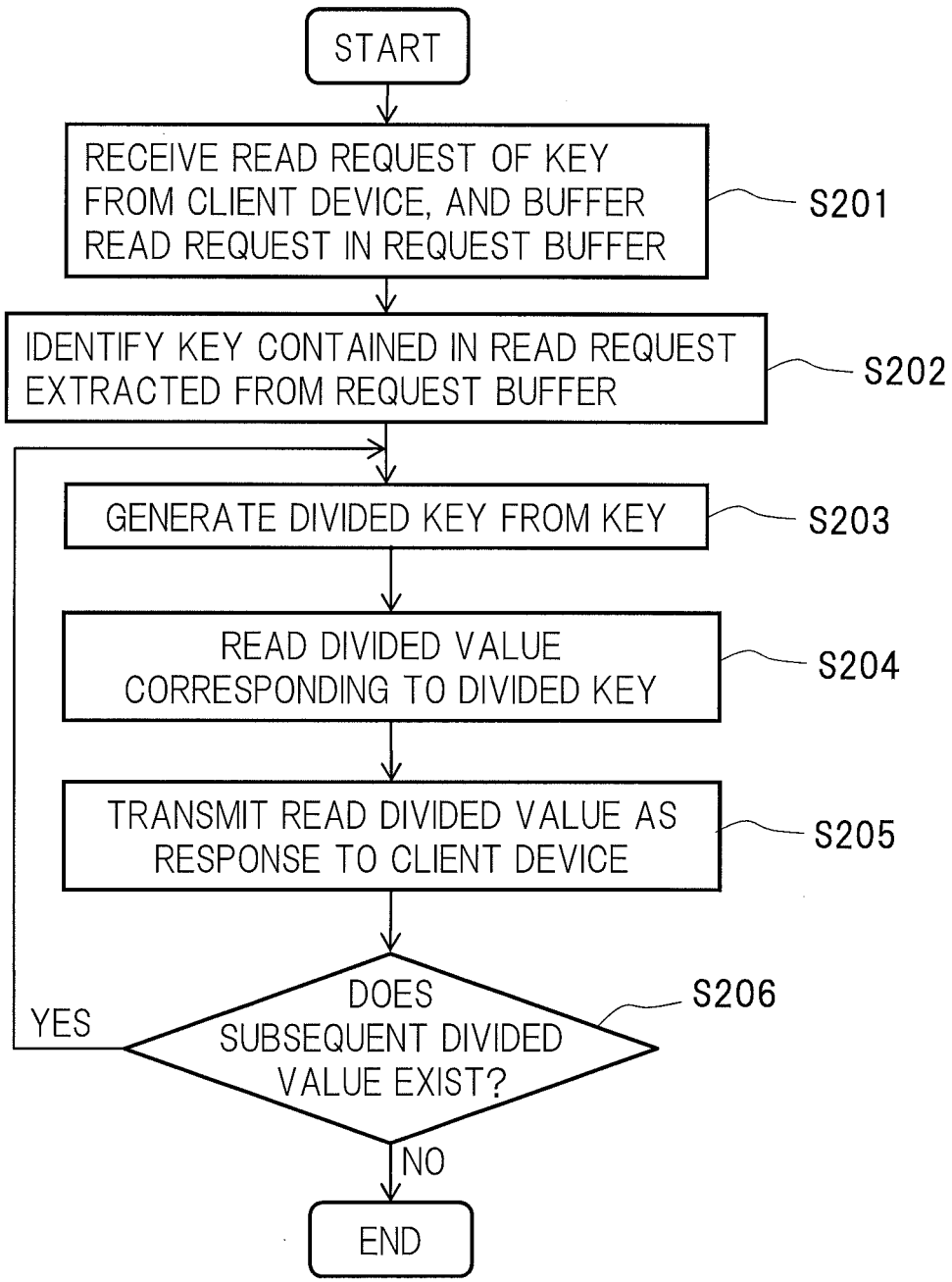
FIG. 12 is a flow chart of an operation example in the third embodiment.

FIG. 12 shows a flow chart of an operation example in the present embodiment. First, the request receiver 201 receives a read request of a key value from the client device and causes the request buffer 202 to buffer the received read request (S201). The read request contains, for example, a header and the key (first key).

The divided key generator 203 extracts a read request buffered in the request buffer 202 and identifies the key contained in the read request (S202). The divided key generator 203 generates a divided key (second key) from the identified key (S203). The divided key generator 203 instructs the KV processor 204 to read a data structure containing a divided value and the like corresponding to the divided key. The KV processor 204 reads the data structure corresponding to the divided key from the KV storage device 205 and extracts the divided value from the data structure (S204). In the first reading of a divided key, the KV processor 204 may acquire information on the total length of a value contained in header information from the data structure. For the divided value that is read at the first time, the response transmitter 207 generates a response message containing, for example, a header (containing the total length and the like of the value), a key (identical to that specified by the read request), and the divided value, and transmits the response message via an internal transmission buffer (S205). For divided values that are read for the second and subsequent times, data on the divided value is transmitted as it is in the form of a packet via the internal transmission buffer (S205). After the transmission of the response message or the divided value, the transmission buffer may be freed.

The continuation determiner 206 determines whether any subsequent divided value to be read exists (S206), and instructs the divided key generator 104 to generate the next divided key if such a divided value exists (S203). On the other hand, if no such a divided value exists, which means that all the value data requested by the client device have been transmitted, the processing of this flow is finished.

As described above, according to the present embodiment, it is possible to correctly read a value that is stored being divided (divided values) and further to hide the fact of the division from a client device and appear to transmit an original value as a response at once. In addition, since the transmission buffer in the response transmitter 207 can be freed every transmission of the divided value, it is possible to reduce a buffer capacity as compared with the case where the whole value is transmitted at once before being read to the transmission buffer.

In addition, according to the present embodiment, it is possible to concurrently perform the operation among a plurality of read requests in units of reading (in units of divided key). For example, when the reading for the Nth (N is an integer equal to or more than one) divided key about a certain read request, the operation can be performed while being switched to the other read request, and then returned to the original read request to perform the reading for the (N+1)th divided key. Therefore, a read request specifying a large-sized value does not cause a long wait for performing the other read request, and then delays in reading can be stabilized.

(First Modification)

In the above-described embodiment, the continuation determiner 206 determines whether any subsequent divided value exists (a divided value containing the tail of an original value has been read) based on the total length of the original value and the sizes of divided values that have been read thus far. As the other method, as described in the first modification of the first embodiment, it is possible to add subsequent data presence distinguishing information to a header in a data structure in the writing operation, and to use this subsequent data presence distinguishing information in the reading operation. More specifically, the subsequent data presence distinguishing information is identified from the header in the data structure read from the KV storage device, and if the value of this information indicates the presence of subsequent one, it is determined that the subsequent divided value exists (the divided value containing the tail of the original value has not been read yet). On the other hand, if the value indicates the absence of subsequent one, it is determined that the subsequent divided value does not exist (the divided value containing the tail of the original value has already been read).

(Second Modification)

As a method other than that using the subsequent data presence distinguishing information, as described in the second modification of the first embodiment, it is possible to add, in the writing, a division count (the number of reads) to a header in a data structure, in more detail, to the header of a data structure in which a divided value containing the head of an original value is stored, and to use, in the reading, this division count (the number of reads). More specifically, the division count (the number of reads) is identified from a header in a data structure that is read for the first time from the KV storage device, and when the reading of a divided value is performed a number of times indicated by the value of the division count, it is determined that the subsequent divided value does not exist (the divided value containing the tail of the original value has already been read).

Fourth Embodiment

In the third embodiment, when a plurality of divided keys that are generated from a key contained in a read request are processed in turn, the reading may be disabled in the middle due to a storage failure or the like in the KV storage device. There will be described a form that properly performs error processing even in such a case.

Figure 13:
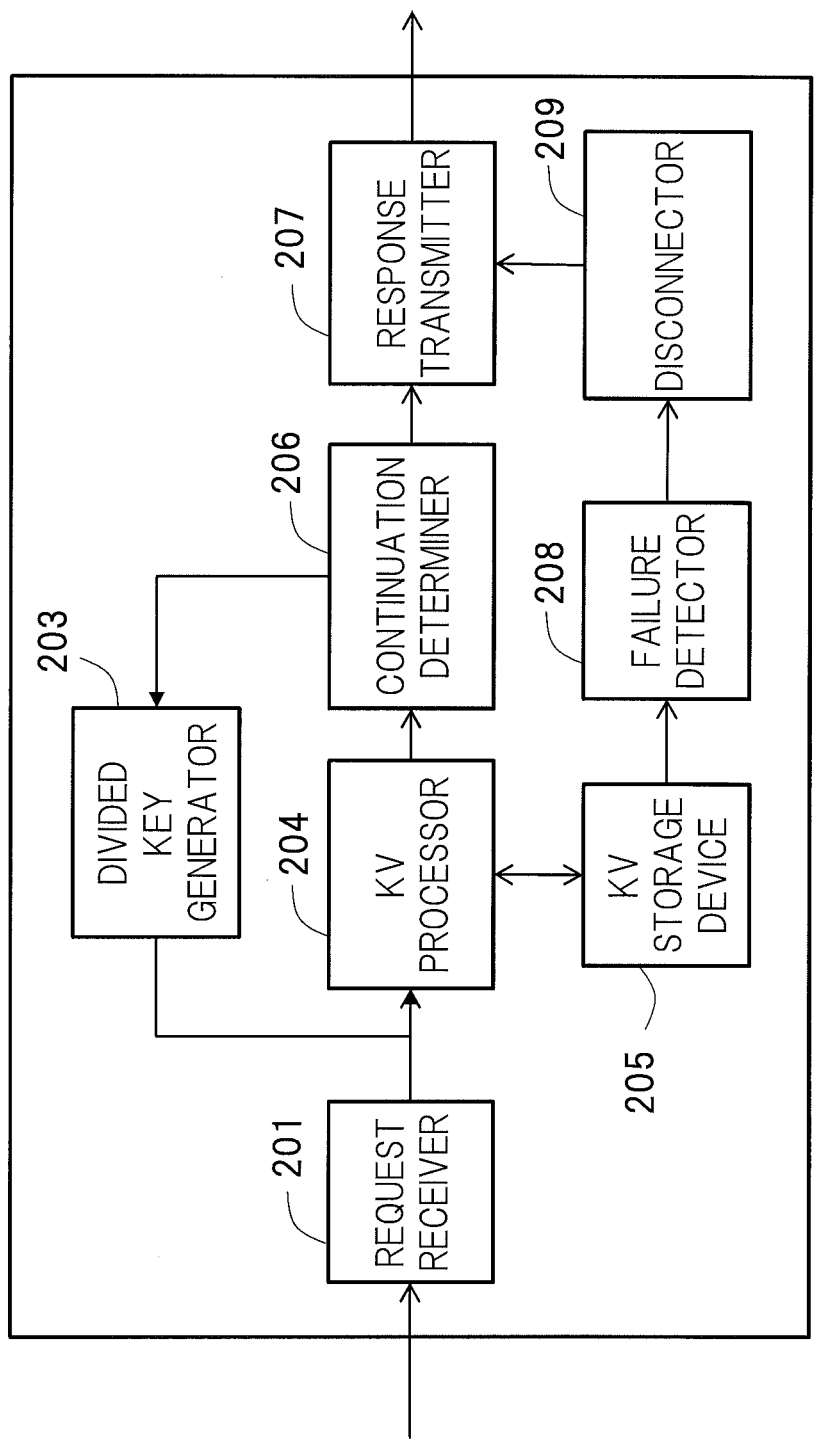
FIG. 13 is a block diagram of a data processing device in a fourth embodiment.

FIG. 13 shows a block diagram of a data processing device in a fourth embodiment. As with the third embodiment, here will also be described a data processing device that allows a reading operation.

As compared with the third embodiment shown in FIG. 11, a failure detector 208 that detects a failure in the KV storage device 205 and a disconnector 209 that disconnects a communication connection are newly provided. Components with the same names as those of FIG. 11 are denoted by the same reference numerals, and will not be described except for extended or altered processing. Note that although the request buffer does not exist, unlike FIG. 11, a request buffer may be added to the stage subsequent to the request receiver 201 as with FIG. 11.

The failure detector 208 detects a failure in the KV storage device 205 and notifies the disconnector 209 of failure detection. A method of detecting a failure may be optional, but for example, the KV processor 204 may monitor a response to an instruction of reading to the KV storage device 205 and may detect a failure if no response is transmitted or an error signal is transmitted as a response. In addition, in the case where a failure occurs, the KV storage device 205 may be configured to output a signal indicating that the failure occurs, and this signal may be detected. In addition, it may be determined that a failure occurs if it is detected that the power of the KV storage device 205 is turned off.

The disconnector 209, when receiving the notification of failure detection from the failure detector 208, disconnects a communication connection (may be a TCP connection or an application-level connection of a layer upper than TCP) with which a key-value read request and a response thereto are transmitted and received.

For example, assume that, in the case where a value to be read (original value) is divided into 10 divided values, the failure detector 208 detects a storage failure in the KV storage device 205 after the first six divided values are read. At this point, these six divided values have been transmitted to a client device, and furthermore, the total length of the original value has been notified using a header that is transmitted together in the transmission of the first divided value. For this reason, the client device waits for the remaining four divided values until the total length of the divided values that have been transmitted reaches the total length of the value. However, the data processing device cannot transmit the four divided values due to the failure. The disconnector 209, when receiving the notification of failure detection from the failure detector 208, disconnects the communication connection (may be a TCP connection or an application-level connection of a layer upper than TCP) with which a key-value read request and a response thereto are transmitted and received. With the disconnection of the communication connection, the client device can learn that any anomaly has occurred in the connection and can exit from the state of waiting the remaining value.

Figure 14:
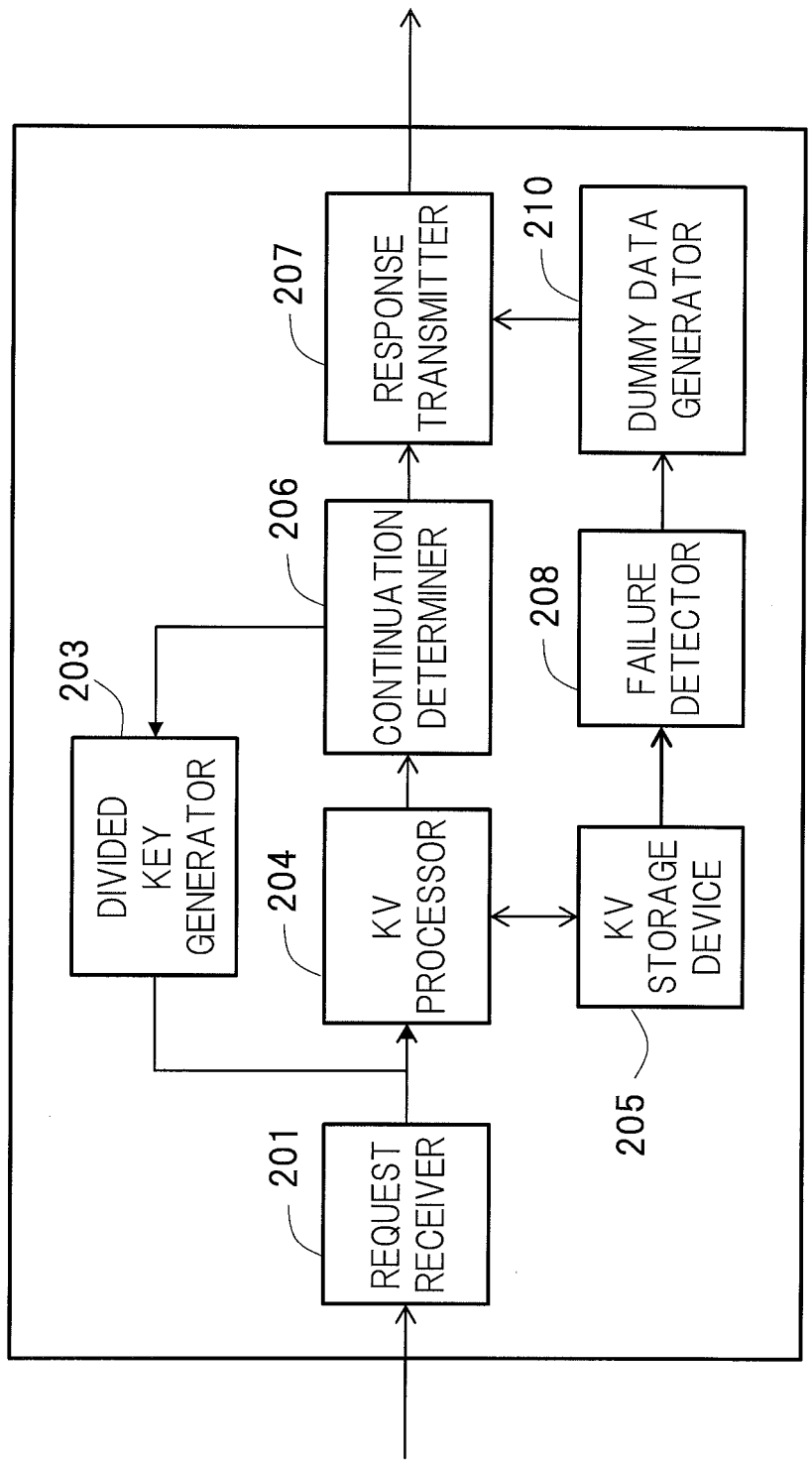
FIG. 14 is a block diagram of another example of the data processing device in the fourth embodiment.

FIG. 14 shows a block diagram of another example of the data processing device in the fourth embodiment. The disconnector 209 in FIG. 13 is replaced with a dummy data generator 210.

The dummy data generator 210, when the failure detector 208 detects a failure, generates dummy data having a size equivalent to the sum of the lengths of remaining one or more divided values that become unable to be read due to the failure. The response transmitter 207 transmits the dummy data instead of the remaining divided values. Thereafter, the response transmitter 207 then notifies a client device of a read error.

The reason for transmitting the dummy data is as follows. If the data is not transmitted by the total length of the value that is notified together at the transmission of the first divided value, the client device does not disconnect the communication connection and thus cannot proceed to the next operation. Thus, in the present embodiment, the dummy data of the remaining divided values is transmitted after the failure detection by which data is transmitted by the length of the value that is first notified. Then, the response transmitter subsequently notifies the client device of the read error. This enables the client device to exit from the state of waiting for the remaining value. In addition, the client device can discard the received data determining that it is incorrect.

The data processing device as described above may also be realized using a general-purpose computer device as basic hardware. That is, each function block (or each section) in the data processing device can be realized by causing a processor mounted in the above general-purpose computer device to execute a program. In this case, the data processing device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

The term "storage" may generally encompass any device which can memorize data permanently by utilizing magnetic technology, optical technology or non-volatile memory such as an HDD, an optical disc or SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data processing device, comprising:
   a request receiver that receives a write request containing a first key and first data;
   a buffer that temporarily buffers the first data contained in the write request;
   a first circuitry configured to, according to a buffering status of the first data in the buffer, read second data which is partial data of the first data that is not read yet out of the first data buffered in the buffer and generate a second key according to a position of the second data in the first data, based on the first key; and
   a second circuitry configured to associate a data structure containing the second data with the second key and add the data structure into a data structure set whose elements are associated with second keys,
   wherein the second key is derived from the first key.

2. The data processing device according to claim 1, wherein the first circuitry reads the second data according to a data size of a contiguous byte sequence that is buffered in the buffer and is not read yet from a head side of the first data.

3. The data processing device according to claim 2, wherein the first circuitry, when the data size reaches a certain value, reads the second data that is the contiguous byte sequence having a size of the certain value, from the head side of the first data.

4. The data processing device according to claim 1, wherein the second circuitry generates the data structure containing the second data so as to further contain the second key that is generated for the second data.

5. The data processing device according to claim 1, wherein the second circuitry, when the second data contains a head of the first data, generates the data structure containing the second data so as to further contain size information on the first data.

6. The data processing device according to claim 1, wherein
   the first circuitry determines whether the second data read from the buffer contains a tail of the first data, and
   the second circuitry generates the data structure so as to further contain subsequent data presence distinguishing information, the subsequent data presence distinguishing information being used to distinguish whether the second data contains the tail of the first data.

7. The data processing device according to claim 1, wherein
   the write request contains size information on the first data,
   the first circuitry calculates count information based on the size information on the first data, the count information indicating how many times to perform reading from the buffer, and
   the second circuitry generates, when the second data contains a head of the first data, the data structure containing the second data so as to further contain the count information.

8. The data processing device according to claim 1, wherein
   the write request contains size information on the first data, the first circuitry, when a size of the first data is equal to or less than a predetermined size, reads a whole of the first data when a whole of the first data is buffered in the buffer, and the second data is the whole of the first data or partial data of the first data.

9. The data processing device according to claim 1, wherein the storage device storing the data structure set includes a first storage unit and a second storage unit that has an access speed lower than an access speed of the first storage unit, and the data structure containing the second data that contains a head of the first data is stored in the first storage unit.

10. The data processing device according to claim 1, further comprising a third circuitry configured to detect a failure in the storage device storing the data structure set; and a fourth circuitry configured to, when a fault of the storage device is detected before processing of the write request is completed, generate the second key used to delete the data structure related to the write request, that is already written in the storage device, wherein the second circuitry deletes the data structure corresponding to the second key that is generated by the deletion processor, from the storage device.

11. The data processing device according to claim 1, further comprising a response transmitter that, when the third circuitry detects a failure in the storage device, transmits a response indicating that processing of the write request results in an error.

12. The data processing device according to claim 1, wherein the first circuitry generates the second key by adding a fixed-length identifier to the first key, the fixed-length identifier corresponding to a position of the second data in the first data.

13. The data processing device according to claim 1, wherein the second circuitry registers a correspondence of the second key with a write address of the data structure in correspondence information.

14. A data processing device, comprising a request receiver that receives a read request of first data, the read request specifying a first key;

a first circuitry configured to generate a second key according to a position of second data in the first data based on the first key contained in the read request, the second key being partial or whole data of the first data;

a second circuitry configured to, based on the second key, read a data structure containing the second data associated with the second key from a data structure set whose elements are associated with second keys;

a response transmitter that transmits the second data contained in the data structure read by the second circuitry; and a third circuitry configured to determine whether the second data corresponding to the second key generated by the first circuitry contains a tail of the first data, wherein the first circuitry, when the third circuitry determines that the tail of the first data is not contained, generates the second key according to a position of the second data which is data of a part of contiguous byte sequence subsequent to, in the first data, the second data determined not to contain the tail of the first data, wherein the second key is derived from the first key.

15. The data processing device according to claim 14, wherein the data structure containing the second data that contains a head of the first data contains size information on the first data, and the third circuitry determines whether the second data containing the tail of the first data is read based on the size information on the first data and a size of the second data that is read from the storage device thus far.

16. The data processing device according to claim 14, wherein the data structure containing the second data contains subsequent data presence distinguishing information used to distinguish whether the second data contains the tail of the first data, and the third circuitry determines whether the second data contained in the data structure contains the tail of the first data based on the subsequent data presence distinguishing information contained in the data structure read from the data structure set.

17. The data processing device according to claim 14, wherein the data structure containing the second data that contains a head of the first data contains count information on reading, and the second circuitry determines whether second data containing the tail of the first data is read according to whether reading from the data structure set is performed a number of times corresponding to the count information.

18. The data processing device according to claim 14, wherein the first circuitry generates the second key by adding a fixed-length identifier to the first key, the fixed-length identifier corresponding to a position of the second data in the first data.

19. The data processing device according to claim 14, further comprising:

a fourth circuitry configured to detect a failure in the storage device storing the data structure set; and a fifth circuitry configured to, when a fault of the storage device is detected before processing of the read request is completed, disconnect a communication connection relating to a transmission source device of the read request.

20. The data processing device according to claim 14, further comprising a fourth circuitry configured to detect a failure in the storage device storing the data structure set; and a sixth circuitry configured to, when a fault of the storage device is detected before reading from the storage device for the read request is completed, generate dummy data having a size of data out of the first data for which reading from the storage device is not completed, wherein the response transmitter transmits the dummy data instead of data having the size of the data for which the reading is not completed.

* * * * *